Oct. 31, 1961
N. S. GRAVES ET AL
3,006,191
FLOW MEASURING APPARATUS
Filed April 25, 1960
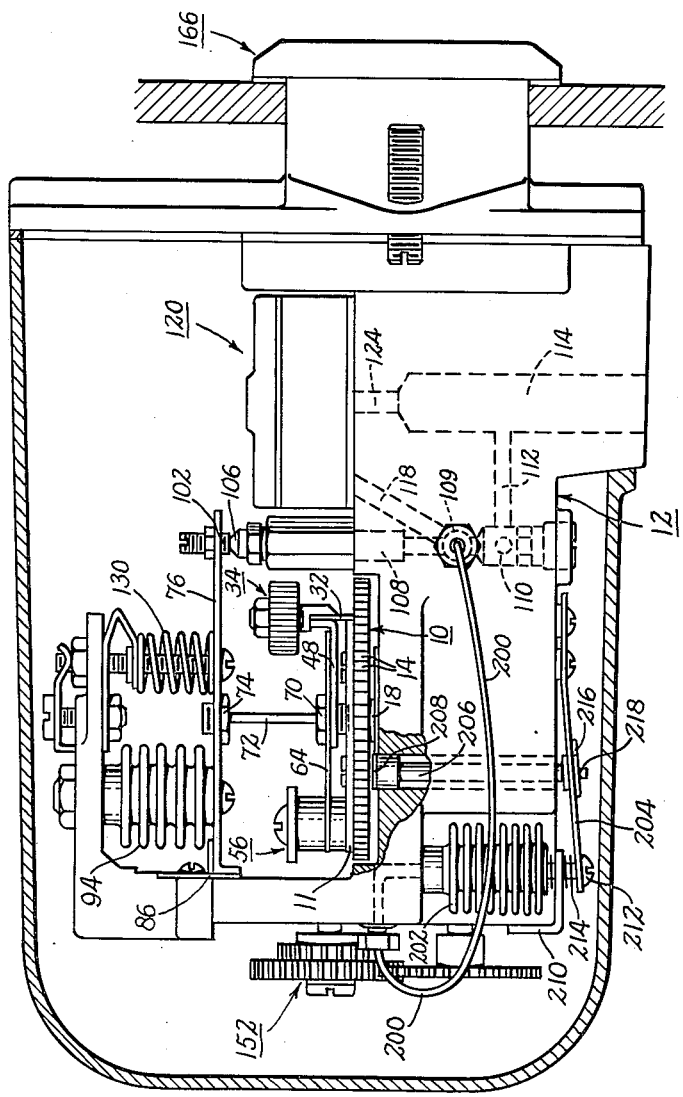
INVENTORS
*Norman S. Graves*
*William R. Brite*
BY
*Curtis Morris + Safford*
ATTORNEYS

United States Patent Office 3,006,191
Patented Oct. 31, 1961

3,006,191
FLOW MEASURING APPARATUS
Norman S. Graves, Foxboro, and William R. Brite, Bellingham, Mass., assignors to The Foxboro Company, Foxboro, Mass.
Filed Apr. 25, 1960, Ser. No. 24,541
9 Claims. (Cl. 73—206)

This invention relates to apparatus for measuring the flow rate of fluids. More in particular, this invention relates to apparatus useful in providing a continuously integrated measure of total fluid flow.

One of the most common methods of determining the flow rate of a fluid is to insert an obstruction such as an orifice plate in the flow stream and measure the pressure differential between the upstream and downstream sides of the obstruction. As is well known, the magnitude of this pressure differential is related to the flow rate of the fluid by a "square-law" function, i.e. the measured differential pressure may, for most practical purposes, be considered to be directly proportional to the square of the fluid velocity.

This square-law relationship creates certain difficulties, particularly where it is desired to compute and indicate the total amount of flow that has taken place over a given period of time. One approach that has met with considerable success in avoiding these difficulties is to use a square-law compensating mechanism in the measuring instrument, such as the rotating flyball arrangement shown in U.S. Patent 2,930,231. In the instrument shown in that patent, a pneumatic pressure signal corresponding to the measured differential-pressure is applied to a balanceable member to which also is applied an opposing force developed by a rotating flyball. This flyball is pivotally supported on a turbine wheel the speed of which is controlled by the balanceable member so as to maintain the forces on this member in balance. Since the centrifugal force generated by a rotating flyball is proportional to the square of its velocity of rotation, the speed of the turbine wheel will, when the member is in balance, be directly proportional to the flow rate of the fluid being measured. By connecting the rotating shaft of the turbine wheel to a counter device arranged to indicate the total number of revolutions of this shaft, there is provided a means for measuring the total volume of fluid flow over a given period of time.

In order to obtain accurate measurements with such an instrument, it is desirable that the turbine wheel normally rotate substantially without friction effects, particularly so that it can readily be accelerated to match a rapid rise in fluid flow rate. However, with such low friction, the wheel tends to coast when its air supply is cut off, and therefore its deceleration may in some cases not precisely match the decrease in fluid flow rate when this flow rate drops suddenly. Thus, the flow rate indicated by the turbine wheel speed may, for short periods of time, be slightly higher than the actual flow rate, and as a result the total volume of fluid flow as measured by the instrument will be slightly higher than the actual total volume. However, in accordance with the present invention, such errors are effectively eliminated by apparatus as described hereinbelow.

Accordingly, it is an object of this invention to provide fluid flow measuring apparatus that is superior to such apparatus used heretofore. It is a further object of this invention to provide a measuring instrument of the centrifugal flyball type wherein the speed of flyball rotation may quickly be changed to closely match rapid changes in flow rate of the fluid being measured, and will diminish to zero substantially at the moment the flow of the fluid being measured has stopped. It is a further object of this invention to provide such apparatus which is capable of accurately measuring the total volume of fluid flow under conditions where the fluid flow rate is fluctuating rapidly. Other objects, advantages and aspects of the present invention will be in part pointed out in, and in part apparent from, the following description considered together with the accompanying single drawing which is a side elevation view, partly in section, of a preferred embodiment of the present invention.

Before proceeding with the detailed description, it is desired first to point out that the apparatus disclosed herein is fundamentally identical to that shown in the above-mentioned U.S. Patent 2,930,231. To simplify the presentation of the present application, the drawing herein is based on FIGURE 3 of that patent and, where common parts are involved, the reference numbers used on this drawing are identical to those appearing in that patent.

Referring now to the drawing, the fluid flow measuring and integrating instrument includes rotatable means comprising a turbine wheel 10 mounted in a horizontal position on an instrument block generally indicated at 12. The turbine wheel is formed with a relatively large number of teeth 14 and is mounted on the upper end of a vertical shaft 18. This shaft is rotatably supported by bearings (not shown) of the ball bearing type, to assure substantially friction-free rotary movement of the shaft and turbine wheel.

The turbine wheel 10 is rotated by a conventional turbine nozzle (not shown herein) which directs a stream of air against the teeth 14 in such a manner as to impart rotary motion to the wheel. This turbine nozzle is supplied with air by power means comprising a pneumatic relay 120 which, as will be explained hereinbelow, controls the flow of air in such a manner as to maintain the rotational speed of the turbine wheel directly proportional to the flow rate of the fluid being measured.

The turbine wheel 10 carries a flyball assembly 34 which is secured by a vertical spring strip (flexure) 32 to a plate 11 screwed to the upper face of the turbine wheel. The flyball assembly is mounted for pivotal movement about the pivot axis formed by flexure 32 and a horizontal flexure 64 which is secured to a counterweight 56 diametrically opposite to the flyball. Integral with the flyball assembly is a rigid horizontal arm 48 which is positioned just beneath flexure 64. This latter flexure is formed with an aperture (not shown herein) similar in shape to that of arm 48 and slightly larger in size, so as to provide freedom for upwards movement of arm 48.

On the left-hand end of arm 48 is a jeweled bearing 70 in which is seated a vertical force pin 72. This pin is concentric with the turbine shaft 18 and its upper tip is seated in a second jeweled bearing 74 secured to a balanceable member specifically comprising a horizontal force bar 76. This force bar is supported for pivotal movement at its left-hand end by means of cross-flexures 86.

When the turbine wheel 10 is rotating, the flyball 34 is subjected to centrifugal force urging the flyball outwards, and it therefore tips outwardly about its pivot axis defined by flexures 32 and 64. Accordingly, the centrifugal force developed by the flyball is transmitted by rigid arm 48 and force pin 72 directly to the force bar 76.

A signal bellows 94 is arranged to apply a downwardly directed input force against the force bar 76. This bellows is supplied in the usual way with a pneumatic pressure signal from a conventional differential-pressure flow-sensing device coupled to the fluid being measured. Thus the input force produced by this bellows is related to the fluid flow rate in accordance with the square-law relationship discussed above.

The right-hand end of the force bar 76 comprises flapper means 102 closely adjacent the mouth of a control nozzle 106. This nozzle is supplied with air under pressure through a vertical passageway 108, a horizontal passageway 109, a flow restrictor 110, a second horizontal passageway 112, and an air supply chamber 114. The latter chamber extends down to an opening in the lower surface of the instrument block 12 to permit connection to a source of air under pressure, e.g. 20 p.s.i.

As the force bar rotates about its cross-flexure pivot 86, the flapper 102 moves towards or away from the mouth of nozzle 106 to vary in a precise manner the degree of restriction placed on the flow of air through the nozzle. The rate of air flow through the restrictor 110 and, correspondingly, the pressure drop across this restrictor, will be determined in the usual way by the spacing between the flapper and the nozzle mouth. For example, if the force bar rotates clockwise, this spacing will decrease and thereby decrease the flow of air through the nozzle. The rate of air flow through the restrictor 110 correspondingly decreases and, hence, the pressure drop across this restrictor also decreases. Consequently, since the pressure in the supply chamber 114 is constant, the air pressure in the passageways 108 and 109 will increase.

The horizontal passageway 109 also communicates, through an inclined passageway 118, with the input chamber of the pneumatic relay 120. This relay is supplied with air under pressure through a vertical passageway 124 communicating with the supply chamber 114, and the relay provides an output air pressure signal proportional in magnitude to the back-pressure of nozzle 106. This output signal is transmitted to the turbine nozzle through further passage (not shown) in the instrument block 12. Thus, the velocity of the air stream striking the turbine wheel teeth 14 is precisely controlled by the positioning of the force bar 76 with respect to the control nozzle 106.

During normal operation of the instrument, the net torque applied to the force bar 76 will be zero so that it will remain stationary. That is, the clockwise torque produced by the signal bellows 94 will be equal to the counterclockwise torque produced by the centrifugal force, transmitted through force pin 72, and the force of the tension zero spring 130. Under this condition of equilibrium, the rotational speed of the turbine shaft 18 corresponds directly to the flow rate of the fluid being measured, and the total number of shaft revolutions over a given period of time will correspond directly to the total volumetric fluid flow over that time period. To provide an indication of the total flow, shaft 18 is connected within instrument block 12 to gears 152 which drive a shaft (not shown) connected to a conventional counter 166 on the front of the instrument.

If there is an increase in the flow rate of the fluid being measured, the force produced by the signal bellows 94 will increase, and the force bar 76 will rotate a slight amount clockwise to move the flapper 102 closer to the control nozzle 106. The sensitivity of the instrument is sufficiently high that even a relatively small increase in fluid flow rate will cause the mouth of the control nozzle to be completely closed; in other words, the throttling range of the flapper-nozzle means is small relative to the measurement range of the instrument. When the nozzle closes, the pressure in the passages 108, 109 and 118 will increase, so that the pneumatic relay 120 will supply an increased amount of air to the turbine wheel 10. The turbine thereupon accelerates rapidly, and the flyball assembly 34 thus is subjected to increased centrifugal force which is transmitted through the force pin 72 to the force bar 76.

The turbine wheel will continue to accelerate until the increase in counter torque applied by the force pin 72 exactly equals the additional torque produced by the bellows 94 in response to the increase in the flow rate of the fluid being measured. When this new condition of equilibrium has been reached, the force bar 76 will be lifted up from the control nozzle 106, and the spacing between the flapper 102 and the control nozzle mouth will automatically be readjusted to that required to keep the turbine wheel rotating at the correct velocity necessary to maintain the torques on the force bar 76 in balance.

When there is a decrease in the flow rate of the fluid being measured, the force applied by the signal bellows 94 will correspondingly decrease, and the force bar 76 will rotate counterclockwise to move the flapper 102 away from the control nozzle 106. Because of the high sensitivity of the instrument, a relatively small decrease in fluid flow rate will cause the flapper to be moved completely away from the normal throttling range of the control nozzle 106, and hence the pressure in passages 108, 109 and 118 will drop to its minimum level. When this occurs, the pneumatic relay 120 shuts off the supply of air leading to the turbine wheel 10, and the turbine wheel therefore decelerates until the torques on the force bar again are in balance.

In the arrangement shown in the above-mentioned U.S. Patent 2,930,231, the turbine wheel deceleration was determined essentially by the bearing and air friction effects. Since these friction effects are relatively small, the turbine wheel would, under some conditions of rapid fluctuation in fluid flow rate, not decelerate as rapidly as desired, i.e. the deceleration of the turbine would momentarily not match the decrease in the flow rate of the fluid being measured. As a result, the integrated output of the flow measuring instrument, as indicated by the counter mechanism 166 operated by the turbine wheel shaft 18, would under these circumstances be slightly higher than the actual total volumetric flow. However, this type of error has been overcome by the novel turbine speed control means now to be described.

Connected to the nozzle passage 109 is a conduit 200 leading to a bellows 202 the input end of which is fixed to the instrument block 12. The movable end of this bellows is secured to an elongated spring arm 204 which is fastened to the instrument block at its righthand end. Intermediate its ends, the spring arm is connected to a rod 206 having on its upper end a cylindrical nylon brake pad 208 adapted to engage the lower face of the turbine wheel 10, immediately adjacent the periphery thereof.

During normal operation of the instrument, the pressure supplied to bellows 202 from the nozzle passage 109 expands the bellows an amount sufficient to prevent the brake pad from engaging the turbine wheel 10. If the flapper 102 is moved away from the control nozzle 106, the resulting decrease in pressure in the nozzle passage 109 will be transmitted to the bellows 202 so that this bellows will tend to be collapsed by the spring pressure of the bellows and arm 204. This arm and rod 206 accordingly will shift upwards towards the turbine wheel 10.

If the flapper 102 is moved away from the control nozzle 106 to the end of the normal nozzle throttling range, i.e. so that the relay 120 shuts off the flow of air to the turbine wheel 10, the pressure in the bellows 202 will decrease to such an extent that the arm 204 will move brake pad 208 into engagement with the turbine wheel. As a result, a substantial frictional restraint will be applied to the turbine wheel, and this wheel will decelerate at a high rate to the speed at which equilibrium of the force bar 76 is again achieved. The flapper 102 then will move back towards the control nozzle 106, and the pressure in nozzle passage 109 and bellows 202 will immediately increase to move the brake pad 128 away from the turbine wheel. Normal operation of the instrument accordingly is resumed.

There will, of course, be no engagement of the brake pad 208 whenever the turbine wheel is being accelerated, because under these conditions the pressure in passage 109 and bellows 202 increases so as to move the brake pad farther away from the turbine wheel. Thus, the brake means provided in accordance with the present invention operates only during periods of deceleration of the turbine wheel, and specifically only during periods when the air supply to the turbine wheel is below that required to cause the turbine wheel to rotate.

Immediately adjacent the bellows 202 is a bracket 210 which serves to limit the outward motion of this bellows. The bellows is secured to the spring arm 204 by means of an adjustment screw 212 which is surrounded by a coiled compression spring 214 to assure that there is no lost motion or play in the coupling between the bellows and the spring arm. The rod 206 may be fastened to the spring arm in any suitable manner, preferably by means of a spring clip 216 arranged to seat in a circumferential groove in the reduced-diameter tip 218 of the rod.

Although a specific preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:

1. In condition-measuring apparatus of the type adapted to convert a non-linear condition measurement signal to an output signal linearly corresponding to the value of the condition, and wherein said apparatus comprises: a balanceable member, force-producing means for applying to said member a first force proportional in magnitude to said condition measurement signal, rotatable means including means to develop a centrifugal force in accordance with the speed of rotation thereof, power means for causing said rotatable means to rotate in one direction, transfer means for applying to said balanceable member a second force corresponding to said centrifugal force and in opposition to said first force, control means responsive to changes in the balance of forces applied to said balanceable member, said control means including means to selectively operate said power means to provide acceleration or permit deceleration of said rotatable means as required to maintain said first and second forces in balance, whereby the speed of rotation of said rotatable means corresponds to the value of the condition being measured; the improvement in said measuring apparatus which comprises brake means arranged when actuated to apply a force to said rotatable means to restrain its rotation in said one direction, and brake actuating means under the influence of said control means to actuate said brake means whenever said power means is operated to permit deceleration of said rotatable means.

2. In fluid flow measuring apparatus of the type adapted to convert a non-linear flow signal to a continuous measurement signal linearly corresponding to the flow rate of the fluid, and wherein said apparatus comprises: a balanceable member, force-producing means for applying to said member a first force proportional in magnitude to said flow signal, rotatable means with power means for imparting rotary motion thereto, a weight secured to said rotatable means to produce a centrifugal force in accordance with the speed of rotation thereof, transfer means for applying to said balanceable member a second force corresponding to said centrifugal force and in opposition to said first force, control means responsive to changes in the balance of forces applied to said member and including means for operating said power means to selectively provide acceleration or permit deceleration of said rotatable means so as to tend to maintain said forces in balance after a change in the flow rate of said fluid, whereby the speed of rotation of said rotatable means corresponds to the flow rate of the fluid; the improvement in said measuring apparatus which comprises brake means arranged when actuated to restrain the rotation of said rotatable means, and brake-control means operable to actuate said brake means whenever said power means is operated to permit deceleration of said rotatable means.

3. In fluid flow measuring apparatus adapted to convert a non-linear flow signal to a continuous measurement signal linearly corresponding to the flow rate of the fluid, said apparatus being of the centrifugal flyball type including a balanceable member with input means for applying to said member a first force proportional in magnitude to said flow signal, rotatable means with power means for imparting rotary motion thereto, a flyball weight secured to said rotatable means to produce a centrifugal force in accordance with the speed of rotation thereof, transfer means connected to said flyball weight for applying to said balanceable member a second force corresponding to said centrifugal force and in opposition to said first force, power control means responsive to changes in the balance of forces applied to said member and including means for operating said power means so as to tend to maintain said forces in balance whereby the speed of rotation of said rotatable means corresponds to the flow rate of said fluid; that improvement for assuring accurate operation of said measuring apparatus under conditions of rapid fluctuations in flow rate, which comprises brake means arranged when actuated to restrain the rotation of said rotatable means, and brake-control means responsive to the balance of forces applied to said balanceable member, said brake-control means being operable to maintain said brake means in de-actuated condition when said forces are in balance, said brake-control means further including means to actuate said brake means when said member is unbalanced in response to a decrease in said fluid flow rate, thereby to assure that said rotatable means is rapidly decelerated to the speed required to reestablish the balance of forces applied to said balanceable member.

4. In pneumatic flow integrating apparatus of the flyball type including a balanceable member with means for applying to said member an input force proportional in magnitude to a flow signal developed by a flow-sensing device, rotatable means comprising a pneumatic turbine wheel having a flyball weight secured thereto to produce a centrifugal force in accordance with the speed of turbine rotation, pneumatic power means for transmitting a stream of air to said turbine wheel to produce rotation thereof, a transfer link coupled to said flyball for applying its centrifugal force to said balanceable member in opposition to said input force, pneumatic flapper-nozzle means operable by said balanceable member for controlling the amount of air fed by said power means to said turbine wheel so as to tend to maintain the speed of rotation of said turbine wheel in correspondence with the flow rate of the fluid being measured; the improvement in said apparatus for assuring accurate operation thereof which comprises brake means arranged when actuated to restrain the rotation of said rotatable means, and brake-control means operable by said flapper-nozzle means and including means to actuate said brake means when the output of said flapper-nozzle means changes in response to a decrease in said fluid flow rate, thereby to assure that said turbine wheel is rapidly decelerated to the speed required to reestablish the balance of forces in said balanceable member.

5. Apparatus as claimed in claim 4, wherein said brake means comprises a shiftable element frictionally engageable with said rotatable means.

6. Apparatus as claimed in claim 5, wherein said brake control means comprises pressure-responsive means coupled to the nozzle of said flapper-nozzle means; said pressure-responsive means being operable in accordance with the nozzle back-pressure to move said shiftable element into and out of engagement with said rotatable means.

7. Apparatus as claimed in claim 6, wherein said shiftable element comprises a brake pad engageable with said pneumatic turbine wheel.

8. Apparatus as claimed in claim 4, wherein the throttling range of said flapper-nozzle means is small relative to the measurement range of the apparatus, so that changes in fluid flow rate of relatively small magnitude will produce maximum changes in pneumatic power applied to said turbine wheel, said brake-control means being set to actuate said brake means when said flapper has been moved to the end of said throttling range at which minimum power is applied to said turbine wheel.

9. Apparatus as claimed in claim 8, including a pneumatic relay operable by the back-pressure of said flapper-nozzle means to vary the flow of air to said turbine wheel, said relay serving to shut off the flow of air to said turbine wheel when said flapper has been moved to its maximum distance away from the mouth of said nozzle, said brake-control means being arranged to actuate said brake means when the air stream to said turbine wheel has been shut off.

References Cited in the file of this patent
UNITED STATES PATENTS

| | | |
|---|---|---|
| 1,920,294 | Dougherty | Aug. 1, 1933 |
| 2,713,267 | Wallace | July 19, 1955 |
| 2,930,231 | Bowditch | Mar. 29, 1960 |